(12) United States Patent
Hsu et al.

(10) Patent No.: US 11,946,300 B2
(45) Date of Patent: Apr. 2, 2024

(54) LEVER-OPERATED LATCH DEVICE

(71) Applicant: FOSITEK CORPORATION, New Taipei (TW)

(72) Inventors: An Szu Hsu, New Taipei (TW); Chun Han Lin, New Taipei (TW); Che Wei Chang, New Taipei (TW)

(73) Assignee: Fositek Corporation, New Taipei (TW)

( * ) Notice: Subject to any disclaimer, the term of this patent is extended or adjusted under 35 U.S.C. 154(b) by 88 days.

(21) Appl. No.: 17/453,382

(22) Filed: Nov. 3, 2021

(65) Prior Publication Data

US 2023/0134117 A1 May 4, 2023

(51) Int. Cl.
| | | |
|---|---|---|
| *E05C 9/08* | (2006.01) | |
| *E05B 1/00* | (2006.01) | |
| *E05B 5/00* | (2006.01) | |
| *E05B 13/00* | (2006.01) | |
| *E05B 65/00* | (2006.01) | |

(52) U.S. Cl.
CPC .............. *E05C 9/08* (2013.01); *E05B 1/0092* (2013.01); *E05B 5/00* (2013.01); *E05B 13/002* (2013.01); *E05B 65/006* (2013.01)

(58) Field of Classification Search
CPC .......... E05B 65/006; E05B 65/02; E05B 5/00; E05B 5/006; E05B 1/0092; E05B 7/00; E05B 13/00; E05B 13/002; E05B 13/004; E05B 13/10; E05C 1/06; E05C 1/065; E05C 1/12; E05C 1/14; E05C 1/145; E05C 19/14; E05C 19/145; H05K 5/0221; H05K 5/0295

See application file for complete search history.

(56) References Cited

U.S. PATENT DOCUMENTS

| | | | | |
|---|---|---|---|---|
| 4,828,299 A | * | 5/1989 | Poe ........................ | E05B 63/128 292/DIG. 31 |
| 6,343,815 B1 | * | 2/2002 | Poe ........................ | E05C 19/145 292/DIG. 31 |
| 2004/0021325 A1 | * | 2/2004 | Schlack ................... | E05C 1/065 292/110 |

(Continued)

FOREIGN PATENT DOCUMENTS

| | | | | | |
|---|---|---|---|---|---|
| EP | 2431555 A1 | * | 3/2012 | ........... | E05B 13/002 |
| GB | 2468746 A | * | 9/2010 | ........... | E05B 1/0092 |

*Primary Examiner* — Christine M Mills
*Assistant Examiner* — Christopher F Callahan
(74) *Attorney, Agent, or Firm* — Rosenberg, Klein & Lee

(57) ABSTRACT

A lever-operated latch device includes an assembly of a case body, an actuation body mounted on the case body, a linking member and a slide body. The actuation body has a free end and a pivoted end pivotally connected with the case body in cooperation with elastic members. The free end of the actuation body is formed with two protruding arms and an opening section positioned between the protruding arms. An operation section is disposed in the opening section. The linking member has a first end pivotally connected with the free end of the actuation body (or the operation section) and a second end connected with the slide body. When an operator presses the operation section, the actuation body is permitted to move from a closed position to an opened position so as to drive the linking member and the slide body to move.

20 Claims, 5 Drawing Sheets

(56) References Cited

U.S. PATENT DOCUMENTS

2004/0222647 A1* 11/2004 Smith .................. E05C 19/006
292/336.3
2011/0127895 A1* 6/2011 Conn .................. H05K 7/1487
312/294

* cited by examiner

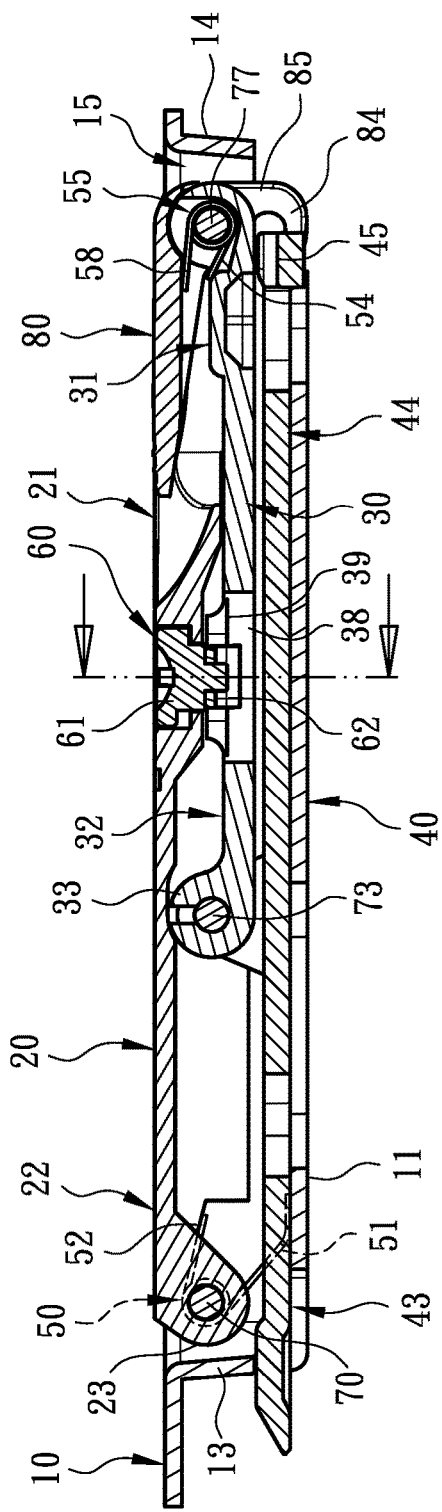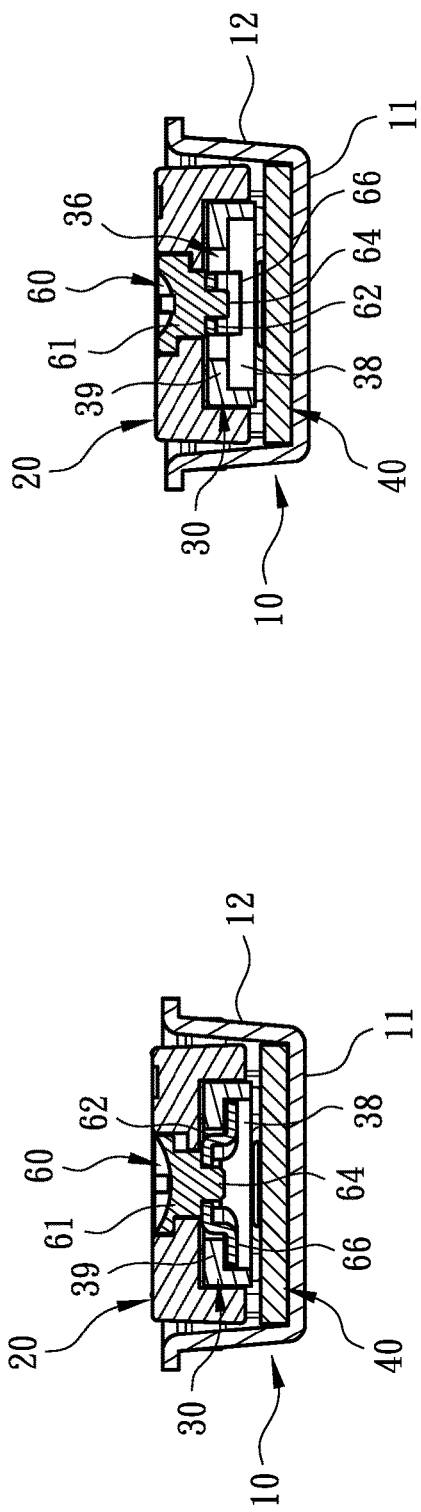

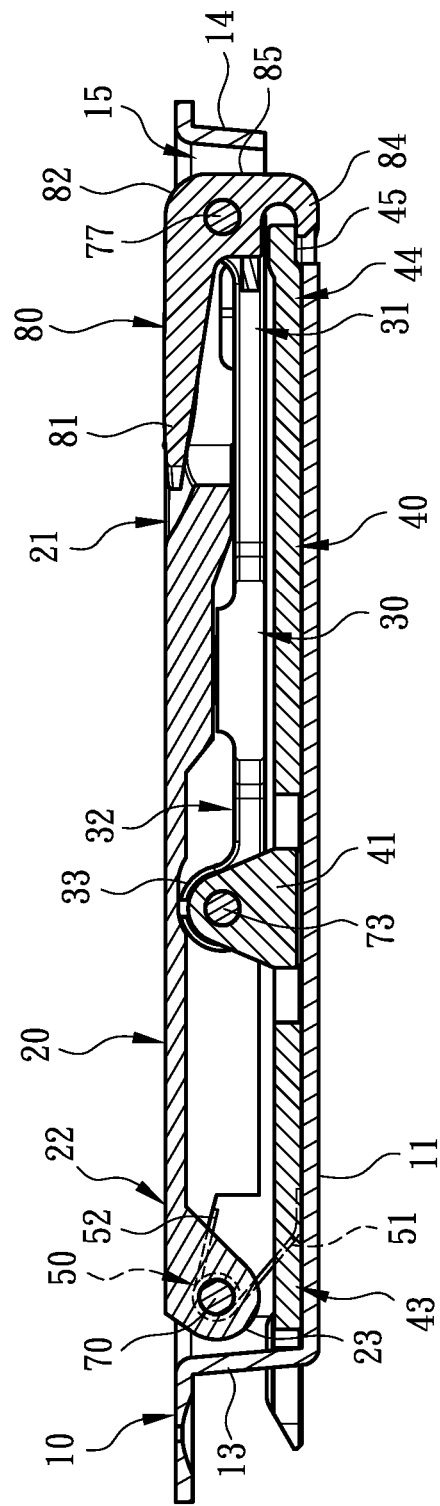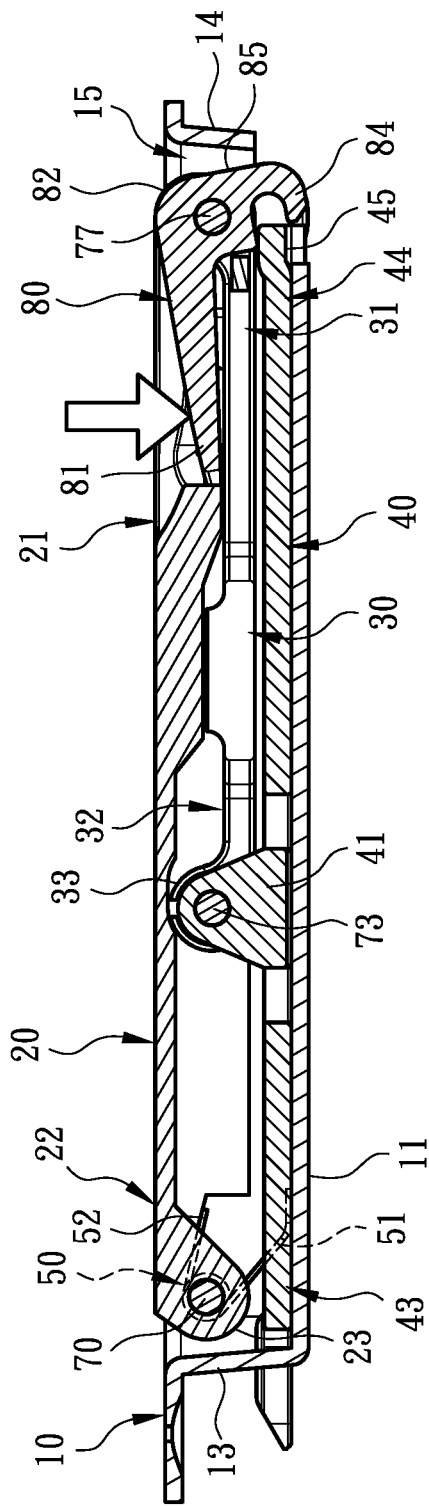

LEVER-OPERATED LATCH DEVICE

BACKGROUND OF THE INVENTION

1. Field of the Invention

The present invention relates generally to a lever-operated latch device, and more particularly to a lever-operated latch device, in which the operation section is connected with the actuation body to improve the shortcoming of the conventional structure that the length/specification is limited by the arrangement space.

2. Description of the Related Art

A conventional latch device or the like device is mounted on a cover board structure of a computer/electronic apparatus, server chassis, etc. An operator can open/close or control the cover board structure to lock the chassis main body and enclose the computer/electronic apparatus therein so as to prevent the internal components of the chassis from being exposed to outer side. When the cover board structure is operated and opened, an operator can lay out the internal components of the chassis, service the internal components of the chassis, and so on.

For example, U.S. Pat. No. 6,174,007 B1 "actuator assembly", U.S. Pat. No. 7,201,407 B2 "sliding panel latch", U.S. Pat. No. 8,256,737 B2 "leverage device and system using same", CN 110388148 A "latch device", CN 207829660 U "lock latch and case assembly including the lock latch" (Taiwanese Patent No. 107207996 "protective cover latch lock) and CN 206685594 U "lock latch and case assembly including the lock latch" (Taiwanese Patent No. 106215877 "chassis latch lock") disclose typical embodiments of latch devices.

Such latch device generally includes a case body, an actuation handle and a slide plate. A pushbutton is disposed at one end of the case body. The actuation handle has a pivoted end pivotally connected with the other end of the case body in cooperation with springs. The other end of the actuation handle is pivotally connected with a link member. The other end of the actuation handle is formed with a protrusion section, which is permitted to insert with the pushbutton into a locking state. When an operator operates the pushbutton to release the protrusion section, the springs push the actuation handle to open the actuation handle, whereby the slide plate is driven to move to make the link member lift the actuation handle.

With respect to the assembling form, structure and operation application of the conventional latch device, under the fixed length or specification of the case body, when the actuation handle and the pushbutton are both arranged on the latch device, it is necessary to shorten the length of the actuation handle. This relatively affects the convenience in operation of the actuation handle. This is not what we expect.

To speak representatively, it is revealed from the above references that the conventional latch devices or the like mechanisms have some shortcomings in structure, assembly design and application. The structural form of the conventional latch device or the actuation handle can be redesigned to eliminate these shortcomings. In this case, the structure of the latch device will be different from the structure of the conventional latch device and the use form of the latch device can be changed to be different from that of the conventional latch device so as to practically enhance the application effect thereof.

It is found that a relatively idealistic latch device must have a structural form capable of overcoming or improving the aforesaid shortcomings of the conventional latch device. Several design requirements of the idealistic latch device should be taken into consideration as follows:

1. In the condition that the structure (or the case body) has the same length or specification, the length of the actuation handle is elongated as greatly as possible. Accordingly, the length of the actuation handle is longer than the length of the conventional structure so that the latch device (or the actuation handle) can be more conveniently operated.
2. A press operation structure is further provided, which is directly connected with the actuation handle (or the actuation body). Such structural form is different from the conventional structure so that in the precondition that the length of the actuation handle is not affected or shortened, the operation structure can be still pressed and the actuation handle (or the actuation body) can be smoothly operated to move.

All the above issues are not taught or substantially disclosed in the above references.

SUMMARY OF THE INVENTION

It is therefore a primary object of the present invention to provide a lever-operated latch device, which includes an assembly of a case body, an actuation body mounted on the case body, a linking member and a slide body. The actuation body has a free end and a pivoted end pivotally connected with the case body in cooperation with elastic members, whereby the actuation body can swing. The free end of the actuation body is formed with two protruding arms and an opening section positioned between the protruding arms. An operation section is disposed in the opening section. The linking member has a first end pivotally connected with the free end of the actuation body (or the operation section) and a second end connected with the slide body. When an operator presses the operation section, the actuation body is permitted to move from a closed position to an opened position so as to drive the linking member and the slide body to move. This improves the shortcoming of the conventional structure that the length/specification of the structure is limited due to the arrangement space/volume so that the convenience in operation is affected.

In the above lever-operated latch device, the operation section includes a press end for an operator to operate and an assembled end. The assembled end is pivotally connected with the first end of the linking member. The assembled end is formed with locating sections in the form of a hook structure. The slide body is formed with subsidiary locating sections corresponding to the locating sections. When the actuation body is positioned in the closed position (or the actuation body is closed into the case body), the locating sections are permitted to be assembled with the subsidiary locating sections, whereby the actuation body is latched on the slide body in a fixed state.

The present invention can be best understood through the following description and accompanying drawings, wherein:

BRIEF DESCRIPTION OF THE DRAWINGS

FIG. 3 is a plane sectional view according to FIG. 1;

FIG. 4 is a plane sectional view according to FIG. 3, showing that the locking mechanism is situated in a locking state;

FIG. 5 is a plane sectional view according to FIG. 4, showing that the locking mechanism is operated and situated in an unlocking state;

FIG. 6 is a plane sectional view of the present invention, showing that the locating sections of the operation section are connected with the subsidiary locating sections of the slide body to make the actuation body positioned in the closed position;

FIG. 7 is a plane sectional view according to FIG. 6, showing that an operator presses the operation section to make the locating sections leave the subsidiary locating sections.

DETAILED DESCRIPTION OF THE PREFERRED EMBODIMENTS

Figure 1:
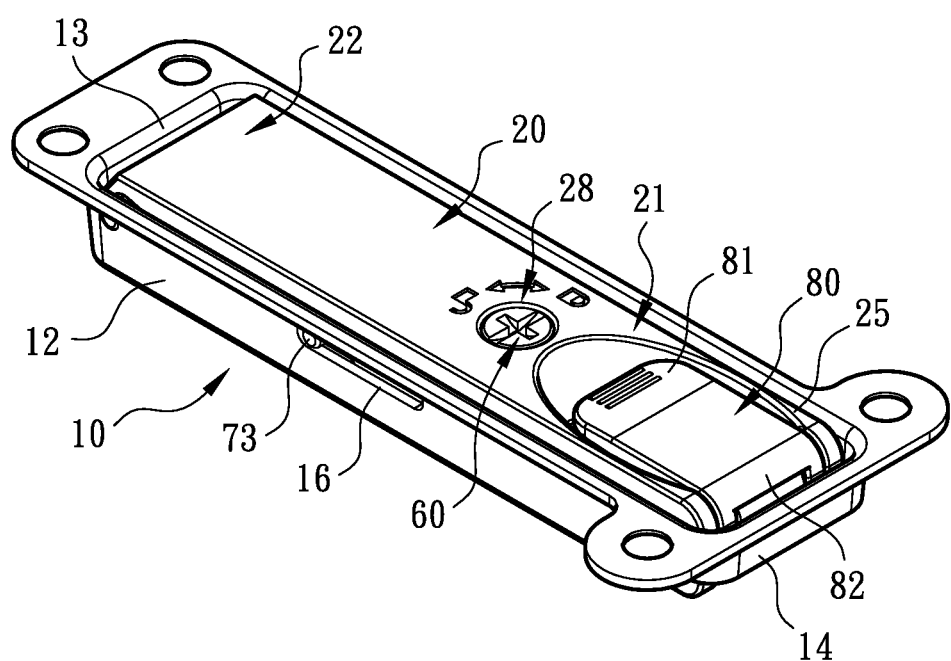
FIG. 1 is a perspective assembled view of the present invention.
Figure 2:
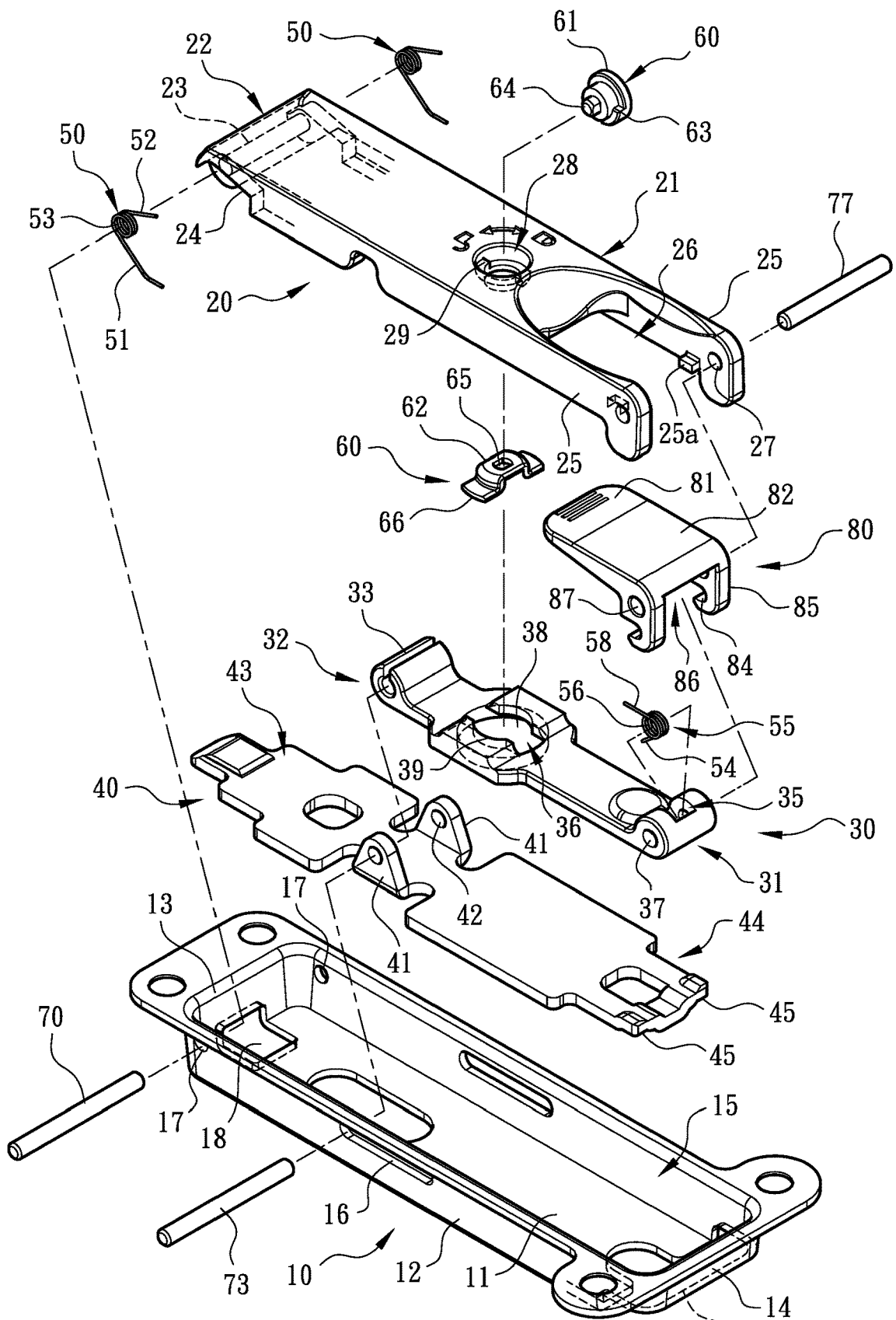
FIG. 2 is a perspective exploded view according to FIG. 1, showing the structures of the case body, the actuation body, the linking member, the slide body and the elastic members of the present invention.

Please refer to FIGS. 1, 2 and 3. The lever-operated latch device of the present invention includes an assembly of a case body 10, an actuation body 20, a linking member 30 and a slide body 40.

The case body 10 has a bottom wall 11, two sidewalls 12 extending in a direction in parallel to an axis of the case body 10 and a primary end wall 13 and a subsidiary end wall 14 connected with the sidewalls and normal to the axis of the case body 10. The bottom wall 11, the two sidewalls 12, the primary end wall 13 and the subsidiary end wall 14 together define an open chamber 15 of the case body 10 for receiving the actuation body 20, the linking member 30 and the slide body 40. Each sidewall 12 of the case body 10 is formed with a slot 16. Each of the primary end wall 13 and the subsidiary end wall 14 is formed with a perforation 18.

The upper section, upper side, lower section, lower side, right side, left side, lateral side, etc. mentioned in the description hereinafter are recited with the direction of the drawings as the reference direction.

In a preferred embodiment, the actuation body 20 is a plate body structure. The actuation body 20 is defined with a free end 21 and a pivoted end 22 pivotally connected with the case body 10 in cooperation with elastic members 50, whereby the actuation body 20 can be operated to swing.

To speak more specifically, the pivoted end 22 of the actuation body 20 is formed with a shafted section 23 and two recessed sections 24 positioned at two ends of the shafted section 23 as spaces for receiving the elastic members 50. Each of the elastic members 50 selectively has the form of a torque spring having a coiled section 53 and a first section 51 and a second section 52 connected the coiled section 53. The shafted section 23 is assembled with a shaft 70. The shaft 70 is fitted through the coiled sections 53 of the elastic members 50 and shaft holes 17 formed on the sidewalls 12 of the case body 10. The first sections 51 of the elastic members 50 abut against the bottom wall 11 of the case body 10, while the second sections 52 abut against the actuation body 20 (or the recessed sections 24), whereby the actuation body 20 can be operated to swing.

As shown in the drawings, the free end 21 of the actuation body 20 is formed with two (parallel) protruding arms 25 and an opening section 26 positioned between the two protruding arms 25. Each protruding arm 25 is formed with a stop section 25a. A tail section of the protruding arm 25 is formed with a pinhole 27. An operation section 80 is disposed in the opening section 26. After the operation section 80 is assembled in the opening section 26 of the actuation body 20, the stop sections 25a serve to keep the operation section 80 in a true position.

In a preferred embodiment, the operation section 80 includes a press end 81 for an operator to operate and an assembled end 82. The assembled end 82 is formed with pinholes 87 and two leg sections 85 in parallel to each other. The two leg sections 85 define therebetween a hollow section 86. Each leg section 85 has a tail end formed with a locating section 84 in the form of a hook structure. A pin member 77 is correspondingly pivotally fitted through the pinholes 87 of the assembled end 82 and the pinholes 27 of the protruding arms 25, whereby the operation section 80 can be operated to swing.

To speak more specifically, the press end 81 of the operation section 80 is directed to the pivoted end 22 of the actuation body 20. The assembled end 82 of the operation section 80 is pivotally connected with the linking member 30. The linking member 30 is defined with a first end 31 and a second end 32. The first end 31 is received in the hollow section 86 of the operation section 80. The first end 31 is formed with a pinhole 37 and a dented section 35 for receiving a spring 55. The spring 55 has a coiled section 56 and a first section 54 and a second section 58 connected with the coiled section 56.

FIGS. 2 and 3 show that the pin member 77 is also fitted through the pinhole 37 of the first end 31 of the linking member 30 and the coiled section 56 of the spring 55. In addition, the first section 54 of the spring 55 abuts against the linking member 30, while the second section 58 of the spring 55 abuts against the operation section 80 (or the assembled end 82).

That is, the first end 31 of the linking member 30 is freely pivotally rotatably connected with the assembled end 82 of the operation section 80 and the free end 21 of the actuation body 20.

In a preferred embodiment, the second end 32 of the linking member 30 is formed with a pivoted section 33 for pivotally connecting with a shaft rod 73, whereby the second end 32 of the linking member 30 is freely rotatable. In addition, the shaft rod 73 is assembled with the shafted section 33 of the linking member 30 and pivotally connected with the slide body 40.

As shown in the drawings, the slide body 40 is a plate body structure. The slide body 40 is movably mounted in the case body 10 (or the chamber 15). The slide body 40 is defined with a primary end 43 and a subsidiary end 44. An assembling section 41 is disposed between the primary end 43 and the subsidiary end 44. The assembling section 41 has the form of a lug structure formed with a shaft hole 42.

Accordingly, the shaft rod 73 is assembled with the pivoted section 33 of the linking member 30 and the shaft hole 42 of the assembling section 41 of the slide body 40. In addition, (two ends of) the shaft rod 73 is pivotally connected in the slots 16 of the case body 10. When an operator presses the operation section 80, the actuation body 20 is permitted to move from a closed position to an opened position, whereby the linking member 30 is driven to move and make the shaft rod 73 move along the slots 16 so that the slide body 40 is driven to move. This improves the shortcoming of the conventional structure that the length/specification of the structure is limited due to the space/volume so that the convenience in operation is affected.

The aforesaid closed position means the position where the actuation body 20 is received in the case body 10 (or the chamber 15), while the opened position means the position where the actuation body 20 (or the free end 21) is moved away from the case body 10.

The subsidiary end 44 of the slide body 40 is formed with subsidiary locating sections 45 corresponding to the locating sections 84 of the operation section 80. When the actuation body 20 is positioned in the closed position (or the actuation body 20 is closed into the case body 10), the locating sections 84 are assembled with the subsidiary locating sections 45, whereby the actuation body 20 is latched on the slide body 40 in a fixed state.

Please refer to FIGS. 2 and 3. A sink 28 is formed on the actuation body 20 between the free end 21 and the pivoted end 22. A restriction section 29 is formed on the sink 28. The restriction section 29 is a protruding plate structure. A locking mechanism 60 is mounted in the sink 28. The locking mechanism 60 includes a rotary body 61 received in the sink 28 and a locking plate 62 pivotally connected with the rotary body 61.

As shown in the drawings, the rotary body 61 is formed with a subsidiary restriction section 63 and a base section 64 in the form of a boss structure. The locking plate 62 has a connection section 65 in the form of a hole structure and wing sections 66 connected with the connection section 65. After the locking mechanism 60 is mounted in the sink 28, the base section 64 (protrudes) to pivotally connect with the connection section 65 of the locking plate 62. When an operator operates the rotary body 61 to rotate, the restriction section 29 of the actuation body 20 provides a system to stop the subsidiary restriction 63, whereby the rotational angle or rotational range of the rotary body 61 is regulated.

A locking hole 36 is formed on the linking member 30 between the first and second ends 31, 32 corresponding to the structure of the locking mechanism 60, permitting the locking plate 62 (or the wing sections 66) to pass through. The locking hole 36 is composed of a through hole 38 and a cooperative annular protruding section 39 formed on the through hole 38.

Please refer to FIG. 4. When the locking mechanism 60 is situated in a locking state, the wing sections 66 are engaged with the locking hole 36 (or the annular protruding section 39), whereby the actuation body 20, the linking member 30 and the slide body 40 are securely closed in the case body 10 (or the chamber 15).

FIG. 5 shows that when an operator rotates the rotary body 61, the wing sections 66 of the locking plate 62 are disengaged from the locking hole 36 of the linking member 30 into an unlocking state.

FIG. 6 shows that the locating sections 84 of the operation section 80 are connected or latched with the subsidiary locating sections 45 of the slide body 40, whereby the actuation body 20, the linking member 30 and the slide body 40 are kept closed in the case body 10 (or the chamber 15).

Figure 8:
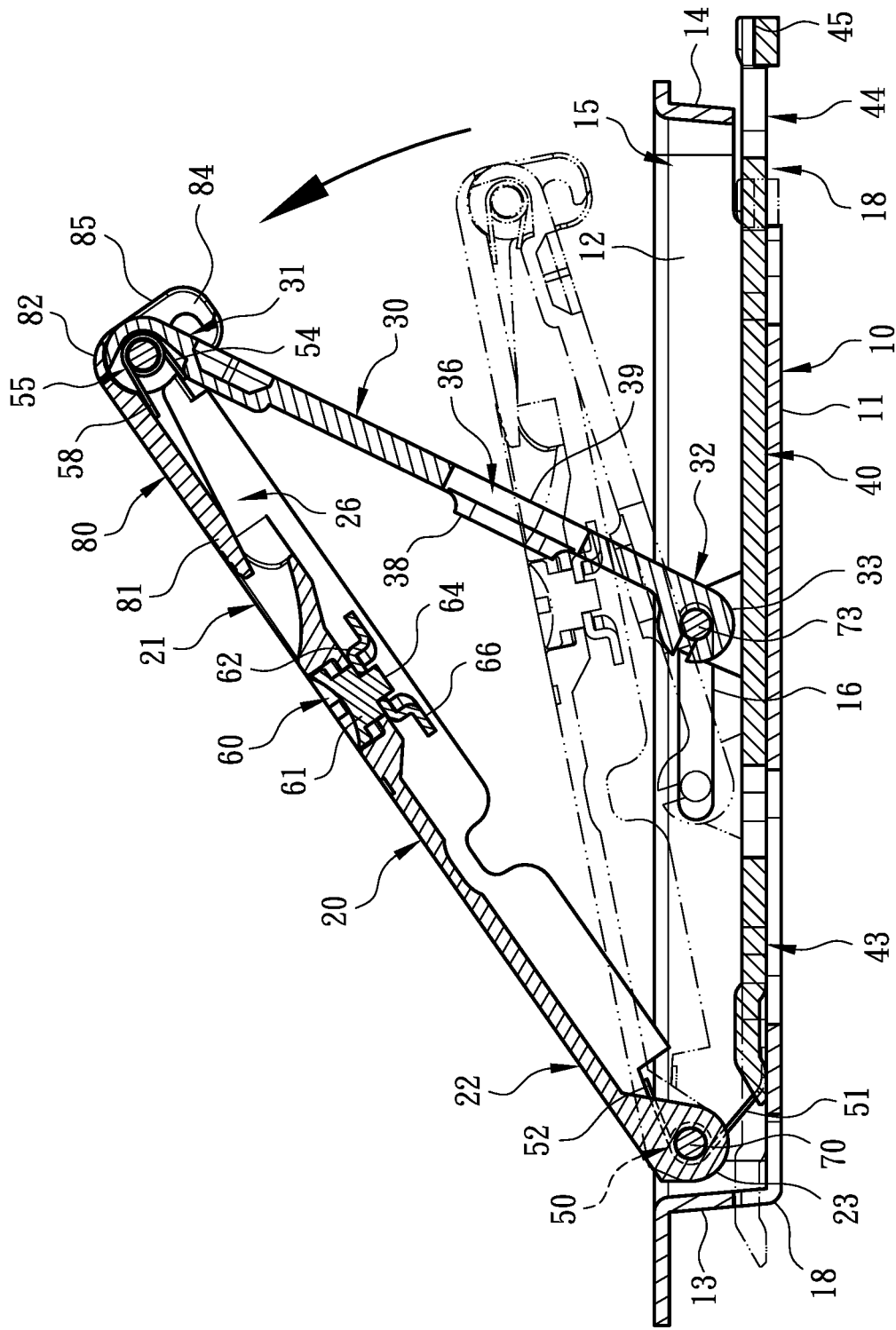
FIG. 8 is a plane sectional view of the present invention, showing that the elastic members drive the actuation body to move upward or to the opened position so as to drive the linking member and the slide body to move.

Please refer to FIG. 7. After the operator presses the press end 81 of the operation section 80, the locating sections 84 of the operation section 80 leave the subsidiary locating sections 45 of the slide body 40. At this time, the elastic members 50 release the stored energy to push the actuation body 20 to move toward the opened position, whereby the linking member 30 is driven to move as shown in FIG. 8.

Also, as shown in the drawings, the actuation body 20 makes the second end 32 of the linking member 30 drive the shaft rod 73 to move along the slots 16, whereby the slide body 40 is moved between the primary end wall 13 (or the perforation 18 thereof) and the subsidiary end wall 14 (or the perforation 18 thereof) of the case body 10.

In a preferred embodiment, when the actuation body 20 is closed in the case body 10, the primary end 43 of the slide body 40 partially protrudes from the perforation 18 of the primary end wall 13 of the case body 10. When the actuation body 20 is positioned in the opened position, the subsidiary end 44 (or the subsidiary locating sections 45) of the slide body 40 is relatively driven to protrude from the perforation 18 of the subsidiary end wall 14 of the case body 10.

To speak representatively, in comparison with the conventional latch device, the lever-operated latch device of the present invention has the following advantages:

1. The case body 10, the actuation body 20, the linking member 30, the slide body 40 and the relevant component structures have been redesigned. For example, the free end 21 of the actuation body 20 is formed with two protruding arms 25 and an opening section 26, in which the operation section 80 is mounted. The assembled end 82 of the operation section 80 is formed with leg sections 85, a hollow section 86 and locating sections 84 for assembling with the first end 31 of the linking member 30, the dented section 35 and the spring 55. The first section 54 of the spring 55 abuts against the linking member 30, while the second section 58 of the spring 55 abuts against the operation section 80. The second end 32 of the linking member 30 is pivotally connected with the slide body 40. The subsidiary end 44 of the slide body 40 is formed with subsidiary locating sections 45 inserted with the locating sections 84 of the operation section 80 to control the actuation body 20, the linking member 30, etc. to close in the case body 10 or permit the actuation body 20 to drive the linking member 30 and the slide body 40 to move. The lever-operated latch device of the present invention is obviously different from the conventional latch device. The structure or assembling relationship of the conventional latch device is changed so that the use and operation form of the lever-operated latch device of the present invention are different from the conventional latch device.

2. Especially, in the condition that the structure (or the case body 10) has the same length or specification (without affecting or shortening the length of the actuation handle), the operation section 80 is directly connected with the actuation body 20. Such structural form is different from the prior art (the actuation handle and the pushbutton are respectively mounted on the case body to occupy different spaces/lengths). Therefore, the length of the actuation body 20 can be elongated as greatly as possible. Accordingly, the length of the actuation body 20 is longer than the length of the conventional structure so that the press end 81 of the operation section 80 can be pressed and the actuation body 20, the linking member 30 and the slide body 40 can be more smoothly operated to move. This improves the shortcoming of the conventional structure that the length/specification of the structure is limited due to the arrangement space/volume so that the convenience in operation is affected.

In conclusion, the lever-operated latch device of the present invention is effective and different from the conventional latch device in space form. The lever-operated latch device of the present invention is greatly advanced, advantageous over the conventional latch device and patentable.

The above embodiments are only used to illustrate the present invention, not intended to limit the scope thereof. Many modifications of the above embodiments can be made without departing from the spirit of the present invention.

What is claimed is:

1. A lever-operated latch device comprising an assembly of a case body 10, an actuation body 20 mounted on the case body 10, a linking member 30 and a slide body 40, the actuation body 20 having a free end 21 and an opposing pivoted end 22, and an intermediate portion extending between the free and pivoted ends of the actuation body 20, the pivoted end 22 being pivotally connected with the case body 10 in cooperation with elastic members 50 positioned at the pivoted end 22 to extend between the actuation body 20 and the case body 10, whereby the actuation body 20 being operable to swing, the free end 21 of the actuation body 20 being formed with two protruding arms 25 and an opening section 26 positioned between the two protruding arms 25, an operation section 80 being disposed in the opening section 26, wherein the elastic members 50 are disposed in spaced relationship with respect to both the intermediate portion of the actuation body 20 and the operation section 80, the linking member 30 having a freely rotatable first end 31 and a second end 32 connected with the slide body 40, the first end 31 being pivotally connected with at least one of the free end 21 of the actuation body 20 and the operation section 80, wherein the operation section 80 includes a press end 81 for an operator to operate and an assembled end 82, wherein the press end 81 of the operation section 80 is directed to the pivoted end 22 of the actuation body 20, and wherein the assembled end 82 of the operation section 80 is pivotally connected with the linking member 30, wherein a spring 55 has a coiled section 56 and a first section 54 and a second section 58 connected with the coiled section 56, the first section 54 of the spring 55 abutting against the linking member 30, while the second section 58 of the spring 55 abutting against the assembled end 82 of the operation section 80, whereby the first end 31 of the linking member 30 is pivotally connected with the assembled end 82 of the operation section 80 and the free end 21 of the actuation body 20, the second end 32 of the linking member 30 being formed with a pivoted section 33 for pivotally connecting with a shaft rod 73, whereby the second end 32 of the linking member 30 is freely rotatable, whereby, when the operator presses the operation section 80, the actuation body 20 is moveable from a closed position to an opened position to thereby drive the linking member 30 and the slide body 40 to move.

2. The lever-operated latch device as claimed in claim 1, wherein the case body 10 has a bottom wall 11, two sidewalls 12 extending in a direction in parallel to an axis of the case body 10 and a primary end wall 13 and a subsidiary end wall 14 connected with the sidewalls and normal to the axis of the case body 10, the bottom wall 11, the two sidewalls 12, the primary end wall 13 and the subsidiary end wall 14 together defining an open chamber 15 of the case body 10 for receiving the actuation body 20, the linking member 30 and the slide body 40, each sidewall 12 of the case body 10 being formed with a slot 16, each of the primary end wall 13 and the subsidiary end wall 14 being formed with a perforation 18, the actuation body 20 being a plate body structure, the pivoted end 22 of the actuation body 20 being formed with a shafted section 23 and two recessed sections 24 positioned at two ends of the shafted section 23 for receiving the elastic members 50, each of the elastic members 50 selectively has the form of a torque spring having a coiled section 53 and a first section 51 and a second section 52 connected the coiled section 53, the shafted section 23 being assembled with a shaft 70, the shaft 70 being fitted through the coiled sections 53 of the elastic members 50 and shaft holes 17 formed on the sidewalls 12 of the case body 10, the first sections 51 of the elastic members 50 abutting against the bottom wall 11 of the case body 10, while the second sections 52 abutting against the recessed sections 24 of the actuation body 20, the protruding arms 25 of the actuation body 20 being in parallel to each other, each protruding arm 25 being formed with a stop section 25a, a tail section of the protruding arm 25 being formed with a pinhole 27.

3. The lever-operated latch device as claimed in claim 2, wherein the operation section 80 includes a press end 81 for an operator to operate and an assembled end 82, the assembled end 82 being formed with pinholes 87 and two leg sections 85, the two leg sections 85 defining therebetween a hollow section 86, each leg section 85 having a tail end formed with a locating section 84 in the form of a hook structure, a pin member 77 being correspondingly pivotally connected with the assembled end 82 and the protruding arms 25, whereby the operation section 80 can be operated to swing, the press end 81 of the operation section 80 being directed to the pivoted end 22 of the actuation body 20, the assembled end 82 of the operation section 80 being pivotally connected with the linking member 30, the first end 31 of the linking member 30 being received in the hollow section 86 of the operation section 80.

4. The lever-operated latch device as claimed in claim 3, wherein the two leg sections 85 of the operation section 80 are in parallel to each other, the first end 31 of the linking member 30 being formed with a pinhole 37 and a dented section 35 for receiving a spring 55, the spring 55 having a coiled section 56 and a first section 54 and a second section 58 connected with the coiled section 56, the pin member 77 being fitted through the pinhole 37 of the first end 31 of the linking member 30 and the coiled section 56 of the spring 55, the first section 54 of the spring 55 abutting against the linking member 30, while the second section 58 of the spring 55 abutting against the assembled end 82 of the operation section 80, whereby the first end 31 of the linking member 30 is pivotally connected with the assembled end 82 of the operation section 80 and the free end 21 of the actuation body 20, the second end 32 of the linking member 30 being formed with a pivoted section 33 for pivotally connecting with a shaft rod 73, whereby the second end 32 of the linking member 30 is freely rotatable, the shaft rod 73 being also pivotally connected with the slide body 40.

5. The lever-operated latch device as claimed in claim 4, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

6. The lever-operated latch device as claimed in claim 3, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

7. The lever-operated latch device as claimed in claim 3, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

8. The lever-operated latch device as claimed in claim 2, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

9. The lever-operated latch device as claimed in claim 2, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

10. The lever-operated latch device as claimed in claim 1, wherein the assembled end 82 being formed with pinholes 87 and two leg sections 85, the two leg sections 85 defining therebetween a hollow section 86, each leg section 85 having a tail end formed with a locating section 84 in the form of a hook structure, a pin member 77 being correspondingly pivotally connected with the assembled end 82 and the protruding arms 25, whereby the operation section 80 can be operated to swing, the first end 31 of the linking member 30 being received in the hollow section 86 of the operation section 80.

11. The lever-operated latch device as claimed in claim 10, wherein the two leg sections 85 of the operation section 80 extend in parallel to each other, the first end 31 of the linking member 30 being formed with a pinhole 37 and a dented section 35 for receiving the spring 55, the pin member 77 being fitted through the pinhole 37 of the first end 31 of the linking member 30 and the coiled section 56 of the spring 55, and wherein the shaft rod 73 is pivotally connected with the slide body 40.

12. The lever-operated latch device as claimed in claim 11, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

13. The lever-operated latch device as claimed in claim 12, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

14. The lever-operated latch device as claimed in claim 11, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

15. The lever-operated latch device as claimed in claim 10, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

16. The lever-operated latch device as claimed in claim 15, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

17. The lever-operated latch device as claimed in claim 10, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

18. The lever-operated latch device as claimed in claim 1, wherein the slide body 40 is a plate body structure, the slide body 40 being defined with a primary end 43 and a subsidiary end 44 formed with subsidiary locating sections 45, an assembling section 41 being disposed between the primary end 43 and the subsidiary end 44, the assembling section 41 having the form of a lug structure formed with a shaft hole 42, a shaft rod 73 being assembled with the linking member 30 and the shaft hole 42 of the assembling section 41 of the slide body 40, two ends of the shaft rod 73 being pivotally connected the case body 10.

19. The lever-operated latch device as claimed in claim 18, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

20. The lever-operated latch device as claimed in claim 1, wherein a sink 28 is formed on the actuation body 20 between the free end 21 and the pivoted end 22, a restriction section 29 being formed on the sink 28, the restriction section 29 being a protruding plate structure, a locking mechanism 60 being mounted in the sink 28, the locking mechanism 60 including a rotary body 61 received in the sink 28 and a locking plate 62 pivotally connected with the rotary body 61, the rotary body 61 being formed with a subsidiary restriction section 63 and a base section 64 in the form of a boss structure, the locking plate 62 having a connection section 65 in the form of a hole structure and wing sections 66 connected with the connection section 65, the base section 64 being pivotally connected with the connection section 65 of the locking plate 62, a locking hole 36 being formed on the linking member 30 between the first and second ends 31, 32, the locking hole 36 being composed of a through hole 38 and a cooperative annular protruding section 39 formed on the through hole 38.

* * * * *